United States Patent [19]

Chandler et al.

[11] E Patent Number: Re. 32,760

[45] Reissued Date of Patent: Oct. 4, 1988

[54] ELECTRICAL CONNECTOR

[75] Inventors: Curtis S. Chandler, King; Larry G. Novotny, Clemmons; Elvert S. Watts, Walkertown, all of N.C.

[73] Assignee: AMP Domestic Inc., Wilmington, Del.

[21] Appl. No.: 18,685

[22] Filed: Feb. 25, 1987

Related U.S. Patent Documents

Reissue of:

[64] Patent No.: 4,501,459
Issued: Feb. 26, 1985
Appl. No.: 652,430
Filed: Sep. 20, 1984

[51] Int. Cl.[4] ..... H01R 25/00

[52] U.S. Cl. ..... 439/188; 439/295; 439/455; 439/610

[58] Field of Search ..... 439/188, 284–295, 439/514, 515, 607–610, 455

[56] References Cited

U.S. PATENT DOCUMENTS

| | | | |
|---|---|---|---|
| 2,938,190 | 5/1960 | Krehbiel | 439/682 |
| 3,091,746 | 5/1963 | Winkler | 439/295 |
| 3,126,241 | 3/1964 | Papalas | 339/222 |
| 3,157,448 | 11/1964 | Crimmins et al. | 439/295 |
| 3,178,669 | 4/1965 | Roberts | 439/291 |
| 3,225,155 | 12/1965 | Duncan | 200/51.09 |
| 3,276,560 | 10/1966 | Wirtz | 197/18 |
| 3,337,836 | 8/1967 | Churla, Jr. | 439/295 |
| 3,368,118 | 2/1968 | Orr | 361/367 |
| 3,634,811 | 1/1972 | Teagno et al. | 439/290 |
| 3,676,833 | 7/1972 | Johnson | 439/295 |
| 3,732,525 | 5/1973 | Henschen et al. | 439/291 |
| 3,827,007 | 7/1974 | Fairbairn et al. | 439/293 |
| 3,840,839 | 10/1974 | Smaczny et al. | 339/49 M |
| 3,846,735 | 11/1974 | Carter et al. | 439/284 |
| 3,860318 | 1/1975 | Reavis, Jr. et al. | 439/406 |
| 3,903,385 | 9/1975 | Moyer et al. | 439/513 |
| 4,034,172 | 7/1977 | Glover et al. | 439/181 |
| 4,070,557 | 1/1978 | Ostapovitch | 439/513 |
| 4,083,617 | 4/1978 | Wyatt | 339/47 R |
| 4,152,041 | 5/1979 | Hollyday et al. | 439/188 |
| 4,186,984 | 2/1980 | Reavis, Jr. et al. | 339/103 R |
| 4,224,486 | 9/1980 | Zimmerman, Jr. et al. | 439/681 |
| 4,274,691 | 6/1981 | Abernethy et al. | 439/507 |
| 4,330,164 | 5/1982 | Pittman et al. | 439/293 |
| 4,337,989 | 7/1982 | Asick et al. | 439/609 |
| 4,386,814 | 6/1983 | Asick | 439/607 |
| 4,386,819 | 6/1983 | Asick et al. | 439/610 |
| 4,405,192 | 9/1983 | Eaby et al. | 439/358 |
| 4,415,223 | 11/1983 | Asick | 439/610 |
| 4,453,798 | 6/1984 | Asick et al. | 439/581 |
| 4,460,234 | 7/1984 | Bogese | 439/557 |
| 4,482,198 | 11/1984 | Crowley | 439/514 |

FOREIGN PATENT DOCUMENTS

| | | |
|---|---|---|
| 1280477 | 7/1972 | United Kingdom . |
| 1378674 | 12/1974 | United Kingdom . |
| 2025711 | 1/1980 | United Kingdom . |
| 1585407 | 3/1981 | United Kingdom . |

OTHER PUBLICATIONS

Engineering and Purchasing Guide, Fifth edition, AMP catalog No. 4507-1, pp. C291, C412.

AMP Shielded and Filtered Products for EMC, AMP catalog No. 82-683, (Issued 5-83), p. 28.

"Approaches to EMI Control in Digital Data Transmission Systems", Nov., 1982; pp. 355-364.

"Developing a Metal Shell Circular Plastic Connector", Nov., 1982; pp. 365-374.

"A Shielded Computer Interface Connector", Nov., 1981; pp. 113-118.

"Metallized Plastic Connector Protects Computers", Design News; 8/3/81; p. 116.

Robinson Nugent catalog IC-8210.

"Berg PC Board Modular Jacks Plug and Unplug as Fast as They Eliminate Hard Wiring Costs"; Elec. Pack. & Prod.; 8/81.

"The Molex KK Interconnection System" advertisement.

Molex catalog No. 800.

"Creating Components that Simplify Circuitry" Molex Publication, 1977.

"Jaguar Multiple Termination Systems", Methode Electrons Inc. catalog.

"Powerpole Modular Connectors", Anderson Power Products catalog, Rev. 1977.

"Berg/Serpent Connector", DuPont Co. Wire Products Bulletin 2000, Sep., 1980.

"12 Amp Power Connector Introduced by Methode", Electronic News; 5/25/81.
"Interconnection City News Digest", Methode Electroics Inc. catalog.

*Primary Examiner*—Neil Abrams
*Attorney, Agent, or Firm*—Eric J. Groen

[57] ABSTRACT

An electrical connector in which preselected terminals are shunted. Contact portions of the terminals are aligned with a shunt bar and are resiliently deformable from positions engaging the shunt bar in an unmated condition of the connector to positions spaced from the shunt bar in a mated condition of the connector by mating engagement with a complimentary connector. The shunt bar comprises a bridge portion from which contact lugs depend spaced asymmetrically along the bridge. Two shunt bars are located in tandem in back-to-back relation in a connector housing so that alternate contact tongues are aligned with respective contact lugs on respective shunt bars.

33 Claims, 6 Drawing Sheets

ELECTRICAL CONNECTOR

Matter enclosed in heavy brackets [ ] appears in the original patent but forms no part of this reissue specification; matter printed in italics indicates the additions made by reissue.

This application is a continuation of application Ser. No. 452,170 filed Dec. 22, 1982, now abandoned.

The invention relates to an electrical connector, more particularly, to an electrical connector for use in the data communications industry.

There is requirement to protect the equipment from which an open data link-line extends to prevent spurious and potentially damaging electrical signals being conveyed along the link-line to the equipment, as a result of misconnection or electrical strays.

Accordingly, it has been proposed to shunt preselected terminals of an interface connector. A disadvantage of some prior proposals is that the shunting mechanism must be manually removed prior to mating of the connector to establish the data link.

In addition, it is important that the resulting construction is simple and reliable in operation and adapted for manufacture by mass production techniques.

According to one aspect of the invention, an electrical connector comprises an insulating housing having a front, mating face and a rear, wire connecting face, a plurality of terminals mounted in the housing with wire connecting portions at the wire connecting face and resilient contact portions at the mating face, electrical shunt means mounted in the housing aligned with preselected contact portions, the contact portions being resiliently deformable from positions engaging the shunt means in a unmated condition of the connector to positions spaced from the shunt means in a mated condition of the connector by mating engagement with a complementary connector. Any need for manipulation of the shunt means prior to mating is thereby avoided.

Preferably, the shunt means comprises a one-piece shunt bar having a bridge portion extending transversely of the contact portions which are formed as tongues, a plurality of mutually spaced contact lugs extending transversely of the bridge portion towards respective preselected contact tongues for engagement therewith in an unmated condition of the connector.

Accordingly, only, spaced preselected terminals need to be shunted, with intermediate terminals being bridged.

More specifically, the contact lugs are asymmetrically located along the bridge portion, and an additional, similar, shunt bar located in tandem relation to and oriented at 180° with the first mentioned shunt bar, the arrangement being such that alternate contact tongues are aligned with respective contact lugs on respective shunt bars.

Coding means may be provided on the shunt bars to ensure that receipt of the shunt bars in the housing in only one predetermined orientation or combination of orientations is possible.

Preferably, the contact tongues are reversely bent with rearwardly extending free ends aligned with the respective contact lugs.

As the tongues pivot about the axis of their fold line during mating engagement, the displacement of the ends away from the contact lugs of the shunt bar is advantageously greater than the displacement of their contact portions.

An example of a connector according to the invention, will now be described with reference to the accompanying drawings in which:

FIG. 3 is an exploded perspective view of the connector;

Figure 1:
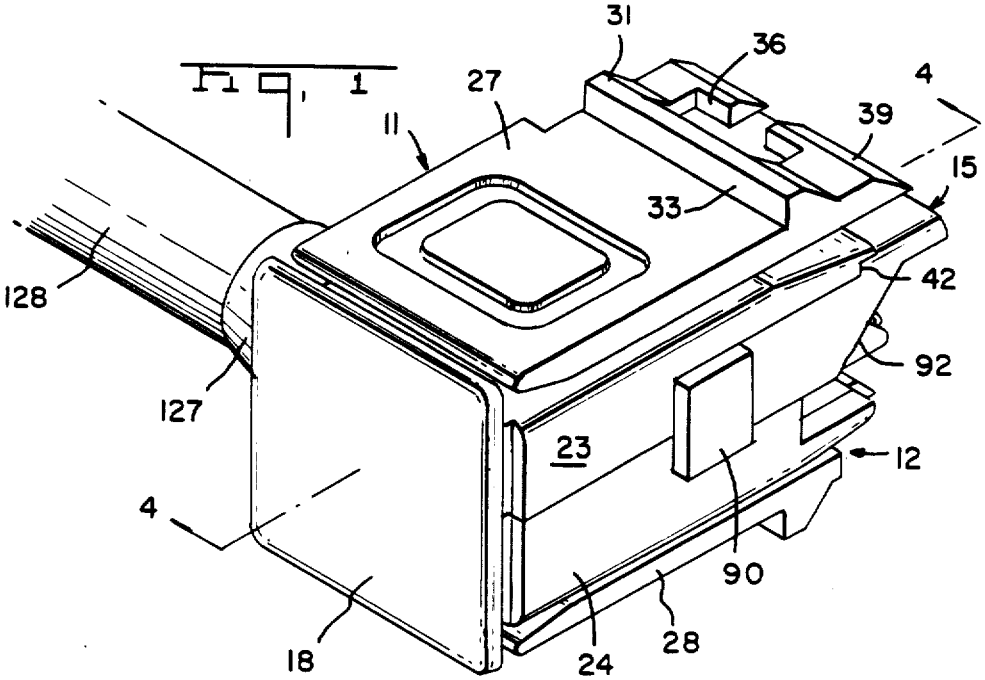
FIG. 1 is a perspective view of the connector with orthogonal cable lead out.
Figure 2:
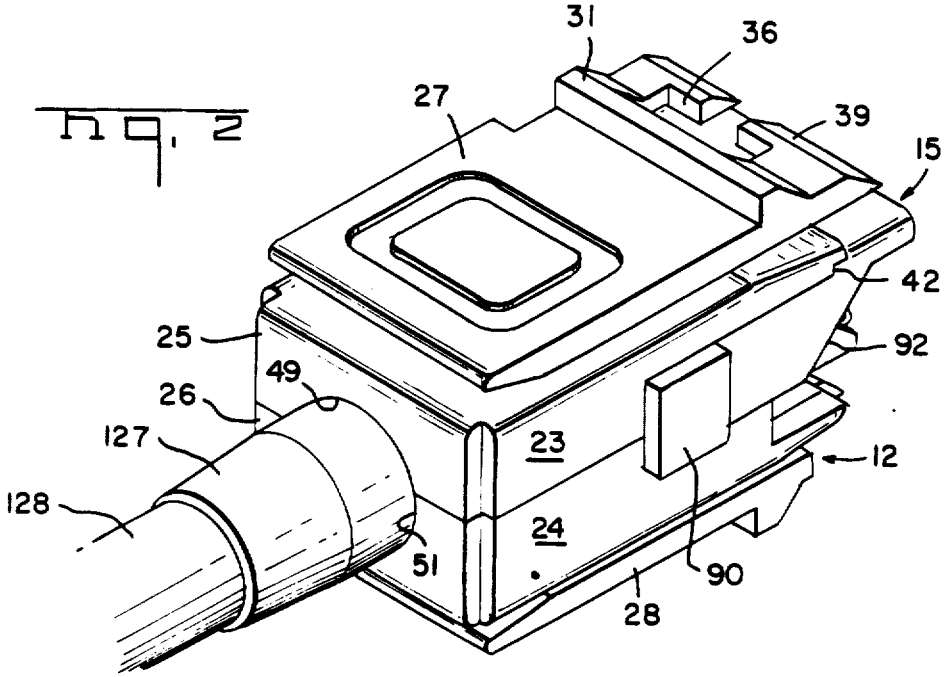
FIG. 2 is a perspective view of the connector with axial cable lead out.

Each connector is of identical hemaphroditic construction and as shown particularly in FIG. 3, comprise a bipartite cover 10 having upper and lower cover parts 11 and 12, respectively, of insulating plastics material, upper and lower cable clamping ground shields 13 and 14 respectively, a housing 15 for terminals 16 and a wire stuffer 17. A rear cap 18 is provided for attachment to the cover where axial cable lead out is not required.

Figure 5:
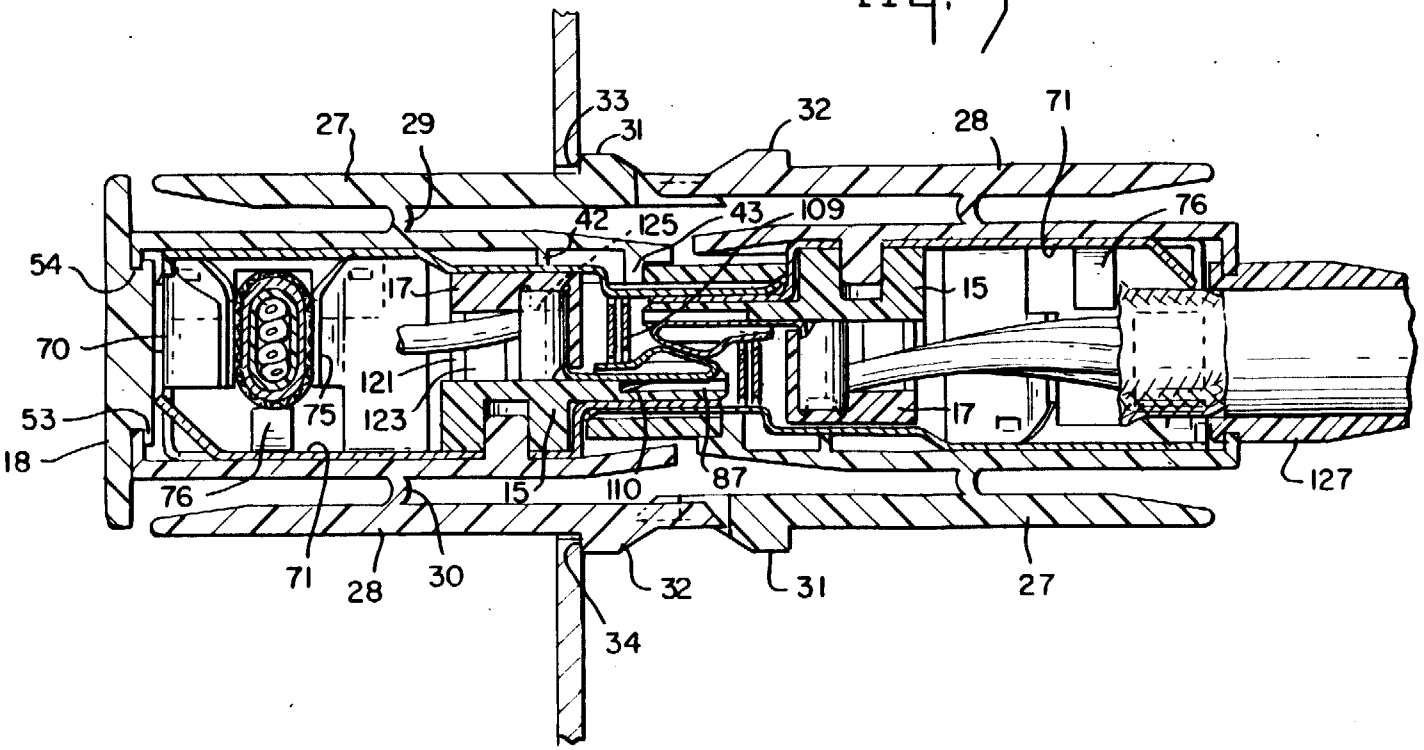
FIG. 5 is a cross-sectional view of the connector pair of FIG. 4 after mating.
Figure 6:
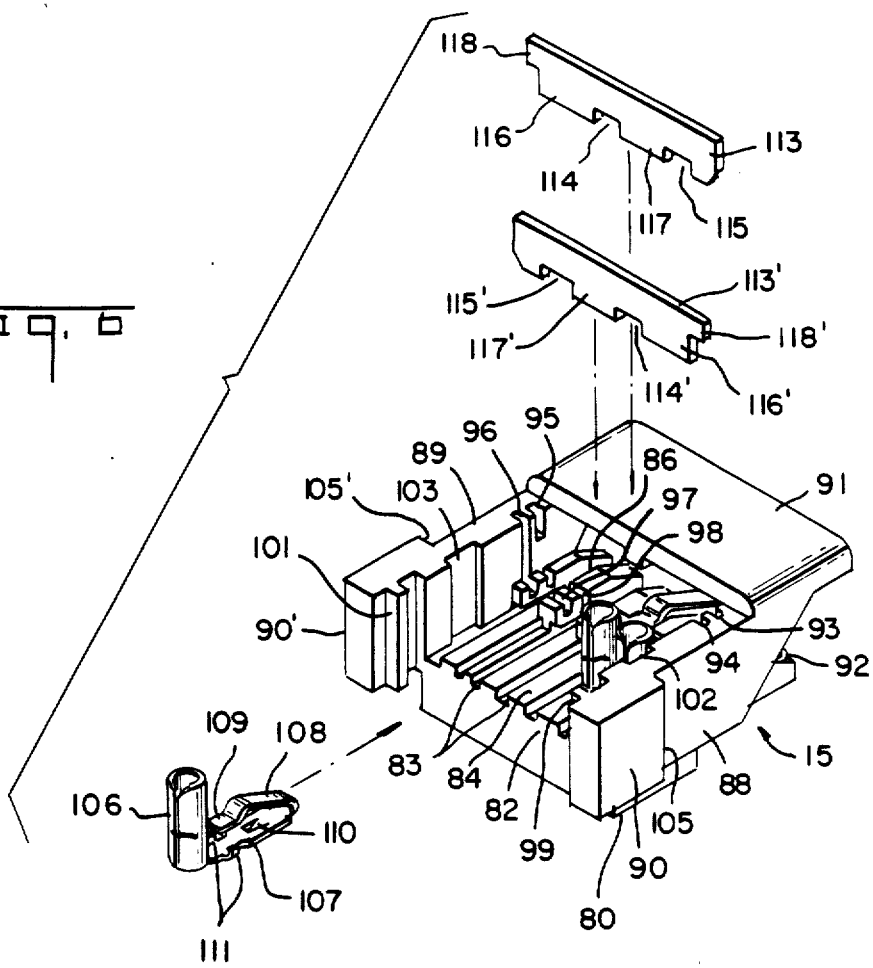
FIG. 6 is an exploded perspective view showing a terminal housing of the connector in greater detail.
Figure 7:
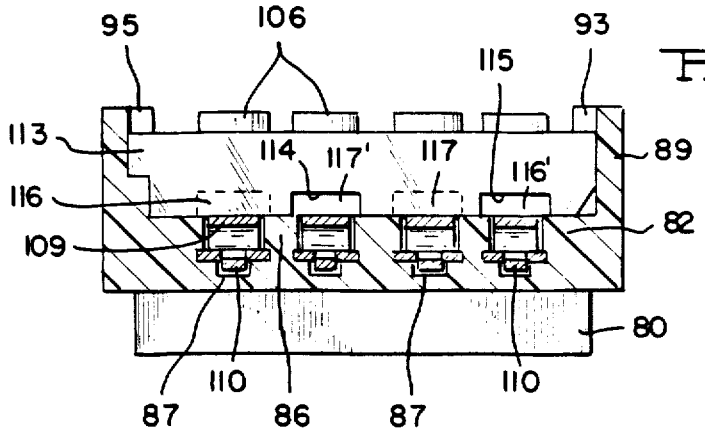
Figure 8:
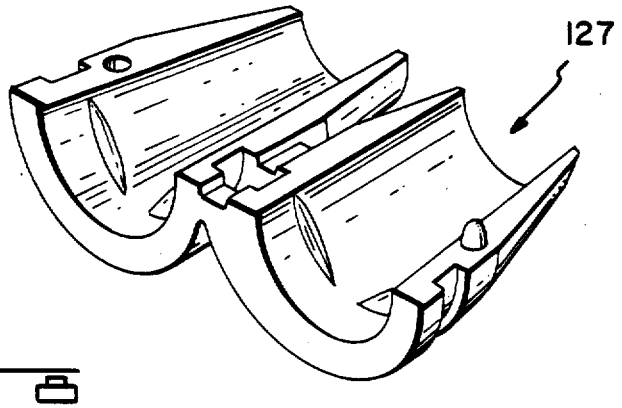

As shown particularly in FIGS. 3 and 6, the upper and lower cover parts 11 and 12 are each moulded in one piece of plastics material and comprise box-like constructions open at a front having respectively, base walls 21 and 22, pairs of opposite side walls 23 and 24 and rear walls 25 and 26. The covers are integrally formed with latching arms 27 and 28, respectively joined to the exterior of the side walls intermediate front and rear ends by web hinges 29 and 30 (as shown particularly in FIG. 5). Panel mounting ribs 31 and 32 defining rearwardly facing shoulders 33 and 34 and having canted, forwardly facing surfaces extend transversely across the arms adjacent front, mating ends which are formed with complementary latches comprising a T-slot 36 in one arm 27 for receiving a T-bar 37 in the other arm 28 having, respectively, canted lead-in surfaces 39 and 40. The side walls of the upper cover part 11 are rebated towards a front end to provide a terminal housing, receiving recess 41. A transverse sheild-locating rib 42 extends across the cover interior in parallel relation to a locating lip 42 stepped back from the front end.

The side walls 24 of the lower cover part 12 are also rebated towards a front end to provide a terminal housing receiving recess 44 and a pair of terminal housing locating studs 45 upstand from the base wall 22 adjacent the front end. Frangible portions 46 are provided in the side walls of both upper and lower cover parts to permit optional cable lead out directions. Cable receiving recesses 49 and 51 are provided in both rear walls to permit axial cable lead out. Cap 18 has a locating boss 53 with a peripheral groove 54 receiving the lips of the recesses 49 and 51 when axial lead out is not desired.

The upper shield 13 is stamped and formed from a single piece of sheet metal and comprises a base panel 61 from opposite sides of which depend flanges 62 having latching apertures 63 on each side of a cable receiving recess 64. A braid contacting tab 65 depends from a rear of the panel and forwardly extending portion 66 is stepped and extends to a bifurcated contact portion having contact tabs with enlarged, upturned contact surfaces 67 at their front ends.

The lower shield 14 is also stamped and formed from one piece of sheet metal stock and comprises flanges 69, 70 that upstand from the opposite sides and the rear of a base panel 71, cable receiving apertures 73 and 74 being provided in such flange and being defined by inturned cable gripping lips 75 on respective opposite sides of each aperture. Braid connecting tabs 76 are pushed out of the base panel adjacent each aperture. Latching detents 77 are provided on the flanges for receipt in the latching apertures 63 where the upper shield is applied to the lower shield. A forwardly extending portion of the base panel is provided with a pair of stud receiving apertures 78 and the front of the base panel is bifurcated and stepped to provide contact surfaces 79 for establishing electrical connection with the contact surfaces 67 of the shield of a mating connector half, as shown in FIG. 5.

Figure 7:
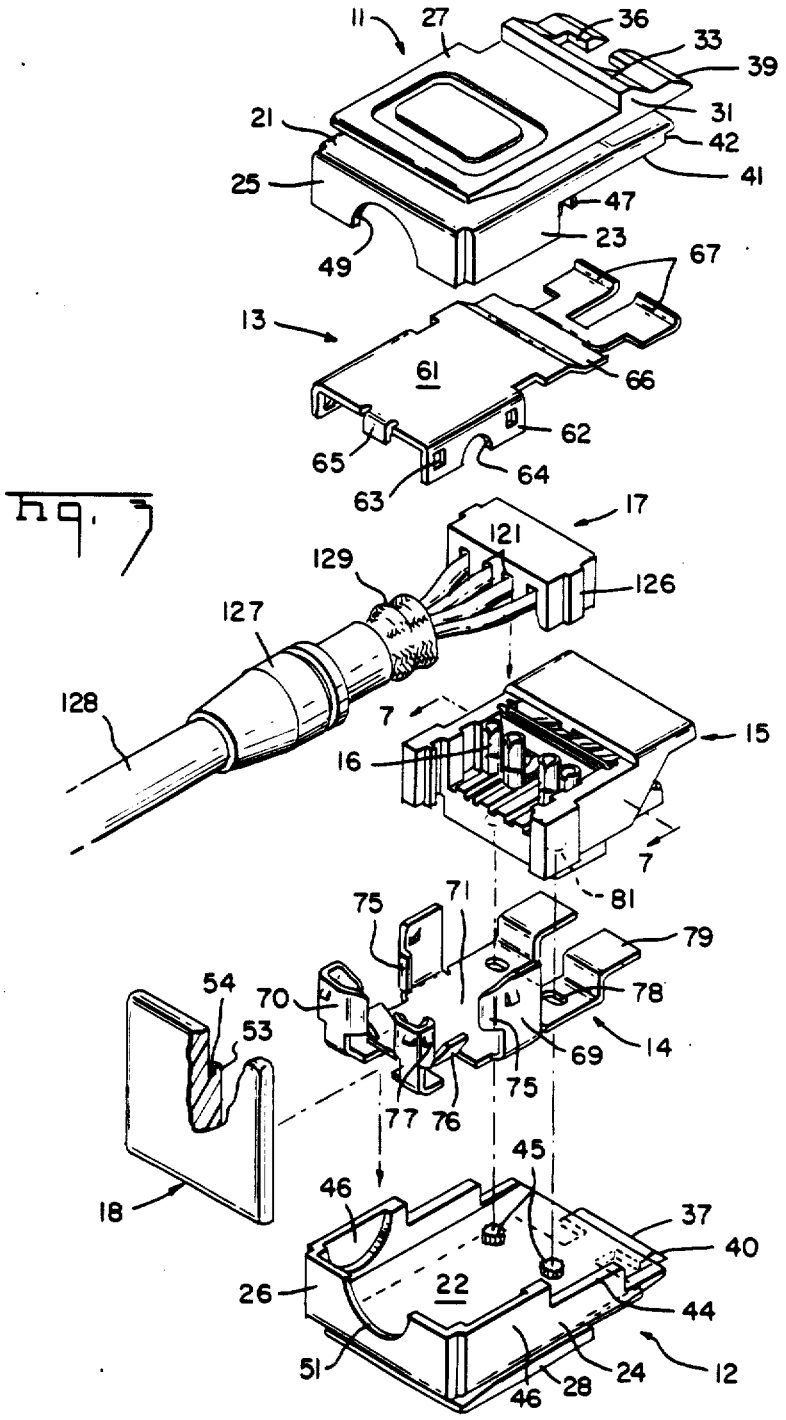
FIG. 7 is a cross-sectional view of the terminal housing taken along line 7—7 of FIG. 3; and, FIG. 8 is a perspective view of a bush for use with the connector.
Figure 4:
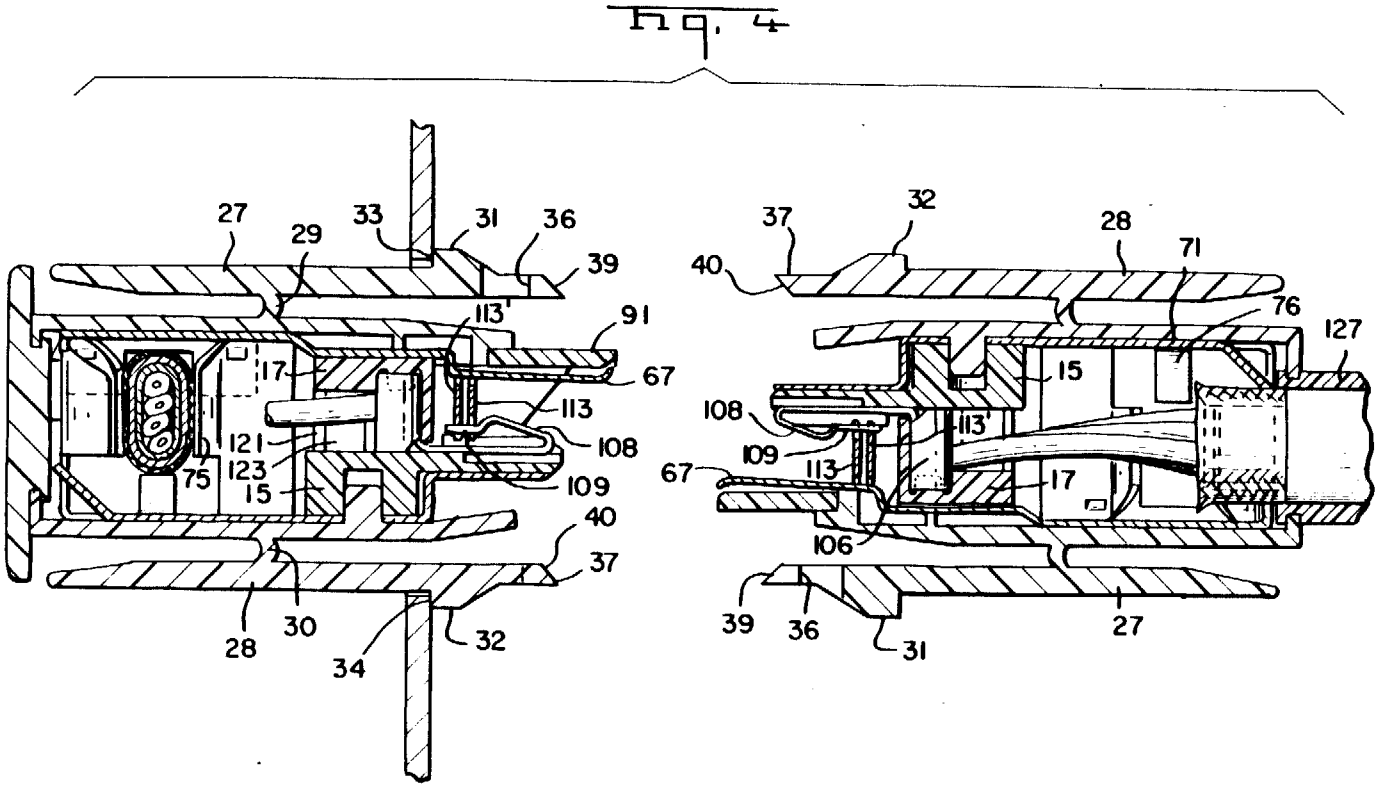
FIG. 4 is a cross-sectional view taken along line 4—4 of FIG. 1 of a pair of similar connectors aligned for mating.

Referring to FIGS. 6 and 7, the terminal housing 15 is moulded in one piece of plastics material and comprises a foot 80 supporting a terminal supporting platform 82 extending between forward, mating and rear, wire connecting faces of the housing. A series of parallel channels 83 extend forwardly across the terminal supporting platform 82 from the wire connecting face defining between them undercut terminal supporting ribs 84. Parallel locking grooves 87 extend rearwardly in alignment with the ribs from the front of the platform. Side walls 88 and 89 upstand from respective opposite side edges of the terminal supporting platform and are bridged at a front end by a hood 91. The side walls have canted leading edges 92 extending from locations adjacent the platform 82 to locations adjacent the front end of the hood. Pairs of aligned downwardly extending slots 93 and 95, 94 and 96 are formed in the side walls adjacent the hood, slots 94 and 95 being less extensive than aligned slots 93 and 96. Slots 97 and 98 are also formed across the ribs 84 in alignment with the respective slots in the side walls.

Adjacent the rear of the housing 15, longitudinally extending portions of the side walls are formed with vertical locating ribs 99, 101 and laterally extending side wall portions 90, 90' define forwardly facing mounting shoulders 105, 105' for abutment with the edges of a panel aperture. Vertically extending guide channels 102 and 103 are located in each side wall intermediate the ribs 99, 101 and the front of the terminal platform 82.

Each terminal 16 is stamped and formed from a single piece of sheet metal stock and comprises an upstanding slotted wire-receiving barrel 106 portion similar to that described in our U.S. Pat. No. 3,860,318 connected by a neck to a body portion 107 from a front end of which extends a reversely bent contact tongue 108 formed with a step 109 at a free end. A locking lance 110 is pushed out from the body portion 107 and locking ears 111 upstand from respective opposite edges of the body portion. The terminals are assembled with the housing 15 by insertion from the rear until their locking lances resile into the locking slots 87 when the side edges of the body portion 107 will be located in the undercut areas under adjacent rear surfaces of the adjacent barrier walls 86, preventing further movement of the terminals in any direction. The contact tongues 108 will then be exposed at the mating face.

Identical shunting bars 113, 113' are stamped from single pieces of sheet metal with spaced apertures 114, 114' and 115, 115' defining between them contact lugs 116, 116' and 117, 117' extending from a bridge portion. Tabs 118, 118' extend from an end of each shunting bar. The shunting bars 113, 113' are located in respective aligned slots 93, 95, 97 and 94, 96, 98, mutually orientated at 180° so that tabs 118, 118' are received in the shorter slots 95, 94 respectively. It should be noted that, as shown in FIG. 7, the apertures 114, 115 of one shunting bar 113 are aligned with the contact lugs 116', 117' of the other bar 113' because of the asymmetric location of the apertures with the result that the contact lugs 116, 117 engage stepped ends 109 and shunt the first and third terminals and contact lugs 116', 117' engage stepped ends of the second or fourth terminals.

The stuffer 17 is moulded in one piece of stiffly flexible plastics material with a series of internal partition walls 123 defining wire receiving passageways extending between outer and inner wire gripping lip pairs 121 and 124 to a cylindrical barrel receiving portion having a cylindrical wire engaging projection 125 similar to that described in our U.S. Pat. No. 4,186,984. Vertical guiding ribs 126 extend on respective opposite ends.

In assembling the connector, the terminals 16 are inserted into the housing 15 as described above and the shunting bars 113, 113' are then inserted into the slots to shunt desired alternate terminals.

A hinged bush 127 is applied to a stripped shielded cable 128 in which shielding braid 129 has been reversely bent to extend rearwardly across a waisted supporting ferrule to clamp the braid and the individual insulated cable wires located in the stuffer passageways shown in FIG. 3. The stuffer is then urged downwardly guided by the cooperation of the ribs 126 and the grooves 102, 103 simultaneously into the wire receiving slots of the barrel portions.

The lower ground shield 14 may be heat staked or otherwise secured in the cover part 12 with the studs 45 registering within apertures 78. The terminal housing 15 terminating the wires is then assembled with the lower ground shield, the exposed braid portion being urged between the resilient lips 75 supported by the ferrule to establish electrical contact with the cable shield and ground. A tab 76 also engages the braid. The upper ground shield 13 is then applied to the housing 15 with the contact surfaces 67 inserted under the hood 91 on opposite sides of an axial rib and to the lower ground shield 14 so that the latching detents 77 are received in apertures 63 when the tab 55 will also engage the cable (with axial lead out) or the lips of a cable receiving recess 64.

The upper cover 11 is then applied to the terminal housing 15 and to the lower cover 12 (with the rear cap 18 omitted where axial lead out is desired) the locating ribs 99, 101 on the terminal housing cooperating with the grooved lugs 47.

On inserting the connector in a panel aperture, the shoulders 33 of the mounting ribs 31 snap behind the edges of the panel aperture on the other side of the panel preventing withdrawal while the shoulders 105, 105' abut the edges on the rear side preventing over insertion. An identical connector rotated through 180° is mated with the mounted connector by the T-bar being received in the T-slot providing a remarkably stable structure. On mating, the contact tongues 108 of the two connectors interengage depressing the stepped ends 109 out of engagement with the contact lugs 116, 116', 117, 117' of the shunting bars 113, 113' and the contact surfaces 79 and 67 of respective shields 13, 14 engage so that the ground shields substantially completely surround the exposed wires and the contacts irrespective of cable lead out direction providing braid-to-braid shielding.

The connector assembly is relatively inexpensive to manufacture in relation to its versatility and reliability of operation providing both reliable electrical characteristics and mechanical mating and mounting characteristics.

We claim:

1. A hermaphroditic electrical connector comprising an insulating terminal housing having a front, mating face and a rear, wire connecting face, a plurality of terminals mounted in the housing with wire connecting portions at the wire connecting face and resilient contact tongues at the mating face, electrical shunt means mounted in the housing aligned with preselected contact tongues, the shunt means comprising two one-piece shunt bars located in tandem relation, each having a bridge portion extending transversely of all the contact tongues and a pair of spaced contact lugs extending from each bridge portion toward respective preselected contact tongues, the contact tongues being resiliently deformable from positions engaging the shunt means in an unmated condition of the connector to positions spaced from the shunt means in a mated condition of the connector by mating engagement with a complementary hermaphroditic connector.

2. An electrical connector according to claim 1 in which the contact tongues are reversely bent with rearwardly extending free ends aligned with the respective contact lugs.

3. An electrical connector as in claim 1 wherein the contact lugs of each shunt bar extend toward alternate contact tongues.

4. An electrical connector as in claim 1 wherein the shunt bars are substantially identical, each shunt bar being oriented 180° from the other.

5. An electrical connector according to claim 1 wherein the contact lugs on each shunt bar are asymmetrically located along the bridge portion.

6. An electrical connector according to claim 5 in which the bridge portions have coding lugs at their ends and the housing is formed with axially spaced coding slots on respective opposite side walls for receiving the respective lugs.

[7. A hermaphroditic electric connector for mating with a complementary hermaphroditic electrical connector comprising:

an insulating terminal housing having a front, mating face, a rear wire connecting face, and a terminal supporting platform extending between said faces, a plurality of terminals mounted in the housing with contact portions toward the mating face and wire connecting portions toward the wire connecting face, each contact portion being reversely bent at the mating face to form a resilient contact tongue spaced from said platform and having a free end remote from the mating face, each contact tongue being matable against the contact tongue of the complementary connector to urge the contact tongues in each connector toward respective platforms, electrical shunt means fixedly mounted in said housing transversely of all said contact portions and disposed adjacent to said contact tongues toward the free ends thereof, said shunt means engaging preselected contact tongues when said connector is in an unmated condition, said shunt means being spaced from said preselected contact portions when said connector is in a mated condition, conductive electrical shield means assembled to said housing, said shield means having contact portions toward the mating face, said contact portions being matable with complementary contact portions of the electrical shield means in a complementary connector, and insulating cover means assembled to said housing externally of said shield means.]

[8. An electrical connector as in claim 7 wherein said preselected contact tongues are alternate contact tongues.]

[9. An electrical connector as in claim 7 wherein all of said contact tongues are engageable by said shunt means when said connector is in an unmated condition.]

[10. An electrical connector as in claim 7 wherein the free end of each contact tongue is formed toward the platform to form a step which engages the electrical shunt means.]

[11. An electrical connector as in claim 7 wherein each said wire connecting portion comprises a slotted wire receiving barrel portion upstanding from said platform, said connector further comprising a wire stuffer profiled to insert wires into respective barrels, said shield means being assembled to said housing externally of said wire stuffer.]

[12. An electrical connector as in claim 7 wherein said shunt means comprises a first one-piece shunt bar having a bridge portion extending transversely of the tongues, said bar having a pair of spaced contact lugs extending toward a first pair of alternate contact tongues, said lugs being in contact with said alternate contact tongues when said connector is in an unmated condition.]

[13. An electrical connector as in claim 12 wherein said housing comprises a pair of opposed sidewalls upstanding from opposite side edges of said platform, said sidewalls having a pair of respective opposed slots therein which receive said shunt bar.]

[14. An electrical connector as in claim 12 wherein said shunt means comprises a second similar shunt bar located in tandem relation to the first shunt bar, said contact lugs on said second shunt bar being in contact with a second pair of alternate contact tongues.]

[15. An electrical connector as in claim 14 wherein said housing comprises a pair of opposed sidewalls upstanding from opposite side edges of said platform, said sidewalls having two pairs of respective opposed slots therein which receive said shunt bars.]

[16. An electrical connector as in claim 15 wherein the bridge portions have coding lugs at their ends and each pair of opposed slots is coded to receive the respective shunt bar oriented at 180° from the other shunt bar.]

17. An electrical connector of the type comprising an insulating housing having a front mating face for mating with a complementary connector and a plurality of terminals mounted thereon, each terminal having a resilient contact tongue extending from proximate the mating face to a free end remote from the mating face, and electrical shunt means fixed in said housing aligned with the free ends of preselected contact tongues, the contact tongues being resiliently deformable from positions engaging the shunt means in an unmated condition of the connector to positions spaced from the shunt means in a mated position of the connector by mating engagement with the complementary connector, characterized in that, the connector is a shielded connector for mating with a complementary hermaphroditic connector, the housing having a rear wire connecting face opposite said front mating face and a terminal supporting platform extending between said faces, each contact tongue being matable against the contact tongue of the complementary connector whereby the contact tongues in each connector are urged toward respective platforms, said shunt means comprising two one-piece shunt bars located in tandem relation, each having a bridge portion extending transversely of all the contact tongues, and disposed above the free ends thereof, and a pair of spaced contact lugs extending from each bridge portion toward respective preselected contact tongues, each shunt bar engaging a pair of preselected contact tongues when said connector is in an unmated condition, each of said shunt bars being spaced from said preselected contact portions when said connector is in a mated condition.

18. The electrical connector of claim 17 wherein the contact lugs of each shunt bar extend toward alternate contact tongues.

19. The electrical connector according to claim 17 wherein the contact lugs on each shunt bar are asymetrically located along the bridge portion.

20. An electrical connector as in claim 19 wherein the shunt bars are substantially identical, each shunt bar being oriented 180° from the other.

*21. An electrical connector comprising an insulative terminal housing having a front mating face and a conductor connecting face, a plurality of terminals mounted in the housing with conductor connecting portions adjacent the conductor connecting face, and resilient contact portions defined by reversely bent portions of the terminals disposed adjacent to the front mating face, with the reversely bent portions extending rearwardly to form terminal free ends, electrical shunt means positioned in the housing between the mating face and the conductor connecting portions and adjacent to said free ends, said shunt means comprising at least two shunts wherein the first shunt commons at least two contact portions leaving at least one intermediate contact portion bridged and at least one further contact portion not shunted, and the second shunt commons the at least one bridged contact portion with the at least one contact portion not shunted by the first shunt, the first and second shunts being in shunted relation when said connector is in an unmated condition, the contact portions being resiliently deformable from positions engaging the shunt means in an unmated condition of the connector to positions spaced from the shunt means in a mated condition of the connector.*

*22. The electrical connector of claim 21 wherein the insulative terminal housing further comprises a terminal support platform adjacent the front mating face with the terminals positioned side-by-side along the terminal support platform, each reversely bent portion forming a contact tongue spaced from said terminal support platform.*

*23. The electrical connector of claim 21 wherein the shunts include contacting portions which extend towards respective preselected contact tongues for engagement therewith in an unmated condition of the connector.*

*24. The electrical connector of claim 23 wherein the shunts are disposed in tandem relation with the contacting portions spaced to contact alternate contact tongues, and bridging portions integral with the contacting portions for bridging over intermediate contact portions.*

*25. The electrical connector of claim 21 wherein the shunt means is stationary relative to the housing.*

*26. The electrical connector of claim 21 further comprising conductive shield means including an upper shield member overlying the terminals and shunt means, and a lower shield member below and adjacent to the terminal support platform, the shield means having contact portions which are matable with complementary contact portions of the electrical shield means in a complementary connector.*

*27. An electrical connector for mating with a complementary electrical connector, comprising:*

*an insulative housing means having a front mating face, a conductor connecting face, and a terminal supporting means adjacent to the front mating face of the insulative housing means, the insulative housing means comprising a base and a cover, and the terminal supporting means comprising a terminal support platform, the base having and open upper face, the terminal support platform being insertable into the open upper face of the base, the cover being assembled to the base over the terminal support platform;*

*a plurality of terminals positioned side-by-side on the terminal supporting means, the terminals having conductor connecting portions at the conductor connecting face and resilient contact portions at the front mating face, the resilient contact portions being intermatable with like contact portions in a complementary connector; and*

*electrical shunt means secured in a stationary position relative to the insulative housing means and positioned adjacent to and engaging free ends of the contact portions when the connector is unmated, the free ends being deflectable away from the shunt means when the connector is mated with the complementary connector.*

*28. The electrical connector of claim 27 wherein the shunt means is insertable through the open upper face of the base.*

*29. The electrical connector of claim 27 wherein the conductor connecting portions comprise insulation displacement portions integral with the terminals profiled for insertion of the conductors through the open upper face of the base.*

*30. A hermaphroditic electrical connector for interconnecting to a plurality of insulated conductors of a multiconductor shielded cable, the connector comprising:*

*an insulative housing means, having a front mating face and a rear face, and further including a terminal support platform as part of the front mating face with a cavity above the terminal support platform being defined by the terminal support platform, two sidewalls, and an upper wall;*

*a plurality of electrical terminals positioned side-by-side along the terminal support platform, the terminals having wire connecting portions towards the rear face and contact portions reversely bent at the front mating face to form contact tongues which extend towards the rear face to a free end remote from the front mating face for interconnection to like contacts in the matable connector, each free end including a stepped portion which extends rearwardly and has a slope relative to the terminal support platform which is less than the*

*slope relative to the terminal support platform of the associated contact tongue; and*

*shunt means, comprising two shunting elements, disposed adjacent to the stepped portions of the terminals for commoning preselected terminals, the stepped portions of the electrical terminals of the electrical connector being resiliently biased against the shunting elements to common preselected terminals when the electrical connector is in an unmated position, the electrical connector being matable with an identical connector when the mating faces of the connector and the identical connector are facing each other and rotated 180° relative to each other, the terminal support platform being insertable into the cavity of the identical connector causing respective terminals of the electrical connector and the identical connector to resiliently deform out of contact with the shunting elements.*

*31. The electrical connector of claim 30 further comprising an upper shield member which is disposed beneath the upper wall and above the terminals and shunt means, and a lower shield member which is disposed below and adjacent to the terminal support platform.*

*32. The electrical connector of claim 31 wherein the upper shield member includes upper contact portions extending towards the front mating face and the lower shield portion includes lower contact portions extending towards the front mating face, and when in a mated position, the upper contact portions of the connector are commoned to the lower contact portions of the matable identical connector, and the lower contact portions of the connector are commoned to the upper contact portions of the matable identical connector.*

*33. The electrical connector of claim 30 wherein the sidewalls have front edges which extend at substantially 45° from a position adjacent to the front mating face rearwardly towards the rear face.*

*34. The electrical connector of claim 33 wherein the terminal support platform extends forwardly of the front edges of the sidewalls, the terminal support platform of the connector being closely toleranced to fit into the cavity and between the front edges of an identical connector aligning the respective terminals of the connector and the identical connector.*

*35. A hermaphroditic electrical connector for interconnecting to a plurality of insulated conductors of a multiconductor shielded cable, the connector comprising:*

*an insulative housing means, having a front mating face and a rear face, and further including a terminal support platform as part of the front mating face with a cavity above the terminal support platform being defined by the terminal support platform, two sidewalls, and an upper wall;*

*a plurality of electrical terminals side-by-side along the terminal support platform, the terminals having wire connecting portions towards the rear face and contact portions defined by reversely bent portions of the terminals disposed at the front mating face for interconnection to matable contacts in the matable connector, and*

*shunt means, comprising two shunting elements positioned within the housing means and in tandem relationship relative to a longitudinal direction of the terminals and disposed adjacent to free ends of the terminals for commoning preselected terminals, the reversely bent portions of the electrical terminals of the electrical connector being resiliently biased against the respective shunting elements to common preselected terminals when the electrical connector is in a unmated position, the electrical connector being matable with an identical connector when the mating faces of the connector and the identical connector are facing each other and rotated 180° relative to each other, the terminal support platform being insertable into the cavity of the identical connector causing reversely bent portions of respective terminals of the electrical connector and the identical connector to resiliently deform out of contact with the shunt means.*

*36. An electrical connector according to claim 1 wherein the bridge portions of the one-piece shunt bars span across all of the contact tongues.*

*37. An electrical connector according to claim 36 wherein the terminal housing comprises a terminal support platform profiled for positioning said terminals in side-by-side registration along said platform, and a pair of opposed sidewalls upstanding from the terminal support platform with the terminals mounted between the two sidewalls, each sidewall including two inwardly facing vertical slots, forming two opposed pairs of slots for receiving respective shunt bars.*

*38. The electrical connector of claim 30 wherein the two shunting elements are disposed in a parallel, side-by-side fashion relative to each other, and extend above the terminal stepped portions, transversely thereto.*

*39. The electrical connector of claim 38 wherein the shunting elements include shunt contacts spaced along the shunting elements to common the preselected terminals.*

*40. The electrical connector of claim 39 wherein the shunt contacts of a first shunting element are spaced to common the stepped portions of a first pair of alternate contacts with a recessed portion intermediate the shunt contacts to bridge the stepped portion of a first intermediate contact in a noncontacting relation.*

*41. The electrical connector of claim 40 wherein the shunt contacts of a second shunting element are spaced to common the stepped portions of a second pair of alternate contacts with a recessed portion intermediate the shunt contacts of the second shunting element to bridge the stepped portion of a second intermediate contact in a noncontacting relation, the second intermediate contact being one of the first alternate contacts.*

*42. The electrical connector of claim 35 wherein the free ends of the terminals are formed as stepped portions which are resiliently biased against the shunting elements, each stepped portion having a slope which is less than the slope of the associated contact tongue.*

*43. The electrical connector of claim 42 wherein the two shunting elements overlie the stepped portions in a spaced apart tandem relation, and in a transverse relation relative to a longitudinal direction of the terminals, a first and second shunting element each having shunt contacts extending towards preselected free ends of the terminals, the shunt contacts in the first and second shunting elements being laterally staggered such that when in the unmated condition, each stepped end is aligned with, and engaged by, only one shunt contact, thereby forming two sets of commoned terminals.*

* * * * *

UNITED STATES PATENT OFFICE

CERTIFICATE OF CORRECTION

Patent No. RE 32,760 Dated October 4, 1988

Inventor(s) Curtis S. Chandler, Larry G. Novotny & Elvert S. Watts

It is certified that error appears in the above-identified patent and that said Letters Patent is hereby corrected as shown below:

In column 9, line 54, claim 35, after the word terminals, insert --positioned--.

Signed and Sealed this

Fifteenth Day of August, 1989

*Attest:*

*Attesting Officer*

DONALD J. QUIGG

*Commissioner of Patents and Trademarks*